(12) United States Patent
Edwards (10) Patent No.: US 7,967,370 B2
(45) Date of Patent: Jun. 28, 2011

(54) VEHICLE BED SYSTEM

(75) Inventor: David M. Edwards, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 515 days.

(21) Appl. No.: 12/017,913

(22) Filed: Jan. 22, 2008

(65) Prior Publication Data

US 2009/0184540 A1     Jul. 23, 2009

(51) Int. Cl.
    *B60J 7/00*         (2006.01)
(52) U.S. Cl. .................................. 296/183.1; 296/186.1
(58) Field of Classification Search .............. 296/186.1, 296/39.2, 39.1, 182.1, 183.1, 193.07
    See application file for complete search history.

(56) References Cited

U.S. PATENT DOCUMENTS

| | | |
|---|---|---|
| 4,342,146 A | 8/1982 | Hanson |
| 4,893,862 A | 1/1990 | Hollenbaugh, Sr. |
| 5,083,827 A | 1/1992 | Hollenbaugh, Sr. |
| 5,795,007 A | 8/1998 | Yamamoto |
| 5,803,524 A | 9/1998 | McCammon |
| 6,120,078 A | 9/2000 | Smyl |
| 6,241,137 B1 | 6/2001 | Corr |
| 6,773,056 B2 | 8/2004 | Fischer et al. |
| 6,871,904 B2 | 3/2005 | Bhat et al. |
| 6,880,875 B2 | 4/2005 | McClure et al. |
| 6,883,851 B2 | 4/2005 | McClure et al. |
| 7,021,693 B2 * | 4/2006 | Keller ..................... 296/100.09 |
| 2002/0149223 A1 | 10/2002 | Saucier et al. |
| 2004/0256873 A1 | 12/2004 | McManus et al. |
| 2005/0206180 A1 | 9/2005 | Andre et al. |
| 2007/0046056 A1 | 3/2007 | Delaney et al. |

FOREIGN PATENT DOCUMENTS

JP          62-012478       1/1987

* cited by examiner

*Primary Examiner* — Joseph D Pape
(74) *Attorney, Agent, or Firm* — Mark E. Duell; Rankin Hill & Clark LLP (57) ABSTRACT

A variable length bed system is provided for a vehicle having a load-carrying bed and a support structure configured to provide support to the bed system. The bed system comprises a floor structure including a bed floor and a separate shell. The bed floor includes a support for directly supporting cargo. The support is a selected support that is selected from a first support having a first length and a second support having a second length that is greater than the first length. The separate shell is connected to a first end section of the support and defines a first storage chamber disposed adjacent the support. The shell has first and second chamber openings. The first chamber is accessible through the first opening. The shell has a fixed size. The differing lengths of the first support and the second support allow the fixed sized shell to be used in varying vehicle sized load-carrying beds.

12 Claims, 11 Drawing Sheets

VEHICLE BED SYSTEM

BACKGROUND

The present disclosure generally relates to a bed system for a vehicle having a load-carrying bed, and particularly relates to an improved bed system that provides a variably-sized load-carrying bed for a vehicle.

Vehicles having load-carrying beds (e.g., pickup trucks) are commonly used to facilitate transportation of cargo items from one location to another, such as through placement of cargo items in the bed. While such vehicles are available in many sizes and configurations, a typical load-carrying bed vehicle includes a bed system that can support cargo, such as lumber, rocks, groceries and/or other items. The bed system generally includes a floor structure, common side members and a headboard member. The side members and headboard member are generally non-variable in size, i.e., fixed length rectangular members which extend upwardly from a location adjacent the floor structure.

The floor structure can include a shell defining a storage chamber and a support, and is typically formed as a one-piece, unitary component. Generally, the support and shell are integrally formed. Separate support braces can be secured to an underside of the floor structure to provide strength and rigidity to the floor structure. Because the components of the conventional bed system are fixed length components, separate floor structures, side members and headboard members are required for different sized vehicles.

There is a need for a bed system that allows for substitution of a limited number of bed components for varying the overall size of the vehicle bed. This bed system can minimize the costs of offering a vehicle with various bed sizes because fewer parts are substituted in the bed system when the bed length is changed.

BRIEF DESCRIPTION

In accordance with one aspect, a variable length bed system is provided for a vehicle having a load-carrying bed and a support structure configured to provide support the bed system. The bed system comprises a floor structure including a bed floor and a separate shell. The bed floor includes a support for directly supporting cargo. The support is a selected support that is selected from a first support having a first length and a second support having a second length that is greater than the first length. The separate shell is connected to a first end section of the support and defines a first storage chamber disposed adjacent the support. The shell has first and second chamber openings. The first chamber is accessible through the first opening. The shell has a fixed size. The differing lengths of the first support and the second support allow the fixed sized shell to be used in varying vehicle sized load-carrying beds.

In accordance with another aspect, a variable length bed system for a vehicle having a load-carrying bed is provided. The vehicle includes a support structure configured to provide support to the bed system. The bed system comprises a bed floor including a first support having one of a first length and a second longer length for directly supporting cargo. The length of the first support is dependent on the size of the vehicle load-carrying bed. A separate shell has a fixed length. A first end section of the shell is connected to a first end section of the first support. The first support allows the same shell to be used in any sized vehicle load-carrying bed. The shell defines a first storage chamber disposed adjacent the first support. A reinforcement component is integrally formed with the first end section of the shell. The reinforcement component is disposed beneath the first end section of the first support. At least one side member extends upwardly from a location adjacent to the shell and bed floor. A headboard member extends upwardly from a location adjacent to a second end section of the bed floor. A closure member is hingedly connected to one of the bed floor and the shell. The closure member defines a second support for directly supporting cargo. The closure member is configured to selectively cover at least a portion of the first opening.

In accordance with yet another embodiment, a variable length bed system for a vehicle having a load-carrying bed is provided. The vehicle includes a support structure configured to provide support to the bed system. The bed system comprises a floor structure and a side member having a fixed length and extending upwardly from a location adjacent to the floor structure. A pillar garnish member is connected to the side member. The pillar garnish member is a selected pillar garnish member that is selected from a first pillar garnish member having a first length and a second pillar garnish member having a second length that is greater than said first length. The first and second lengths are dependent on the size of the vehicle load-carrying bed. A headboard member extends upwardly from a location adjacent to the floor structure.

In accordance with still yet another aspect, a variable length bed system for a vehicle having a load-carrying bed is provided. The vehicle includes a support structure configured to provide support to the bed system. The support structure is in a fixed position relative to the vehicle. The bed system comprises a floor structure and two side members. Each side member has a fixed length and extends upwardly from a location adjacent to the floor structure. Each side member includes a pillar garnish member. A headboard member extends upwardly from a location adjacent to the floor structure. The headboard member includes a base and first and second arms extending from respective first and second end portions of the base. Each arm is secured to separate side members. The headboard member is a selected headboard member that is selected from a first headboard member having first and second arms having a first length and a second headboard member having first and second arms having a second length that is greater than the first length. The first and second lengths are dependent on the size of the vehicle load-carrying bed.

In accordance with still yet another aspect, a method for varying a length of a bed system for a vehicle having a load-carrying bed is provided. A floor structure for the load-carrying bed includes one of a first bed floor having a first length and a second bed floor having a second length longer than the first length and a separate shell having a fixed length. One of the first bed floor and the second bed floor is selected, the selection being dependent on the length of the load-carrying bed. A first end section of the shell is connected to a first end section of the bed floor. The shell defines a first storage chamber. A closure member having a fixed length is provided. The closure member is hingedly connected to one of the selected bed floor and the shell. The closure member selectively covers at least a portion of the first opening of the shell. Left and right side members and a headboard member are provided for the load-carrying bed. At least one of the side members and the headboard member includes a fixed length first component and a second component having a length dependent of the length of the selected bed floor.

DETAILED DESCRIPTION

It should, of course, be understood that the description and drawings herein are merely illustrative and that various modifications and changes can be made in the structures disclosed without departing from the present disclosure. It will also be appreciated that the various identified components of the vehicle bed system disclosed herein are merely terms of art that may vary from one manufacturer to another and should not be deemed to limit the present disclosure. All references to direction and position, unless otherwise indicated, refer to the orientation of the vehicle bed system illustrated in the drawings and should not be construed as limiting the claims appended hereto.

Figure 1:
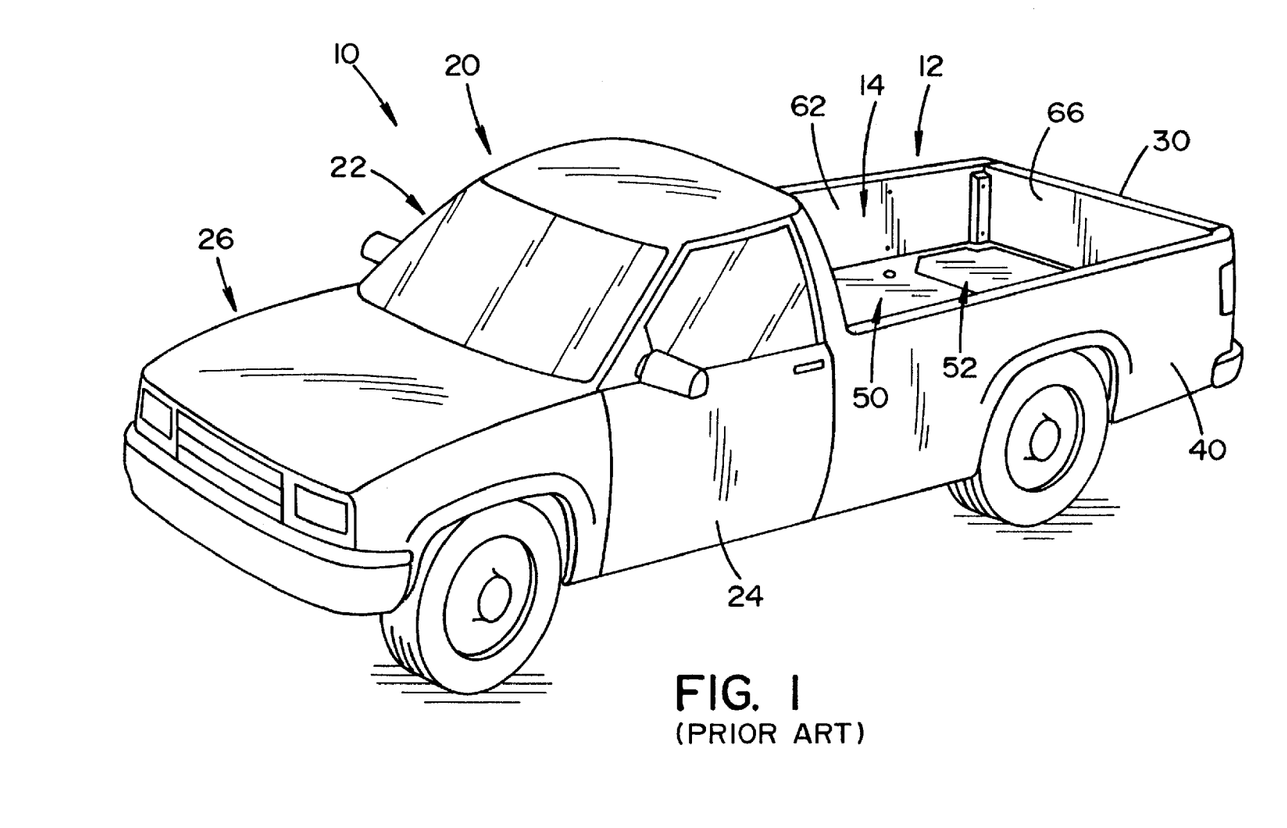
FIG. 1 is a perspective view of a vehicle having a prior art bed system with a non-variable load-carrying bed.
Figure 2A:
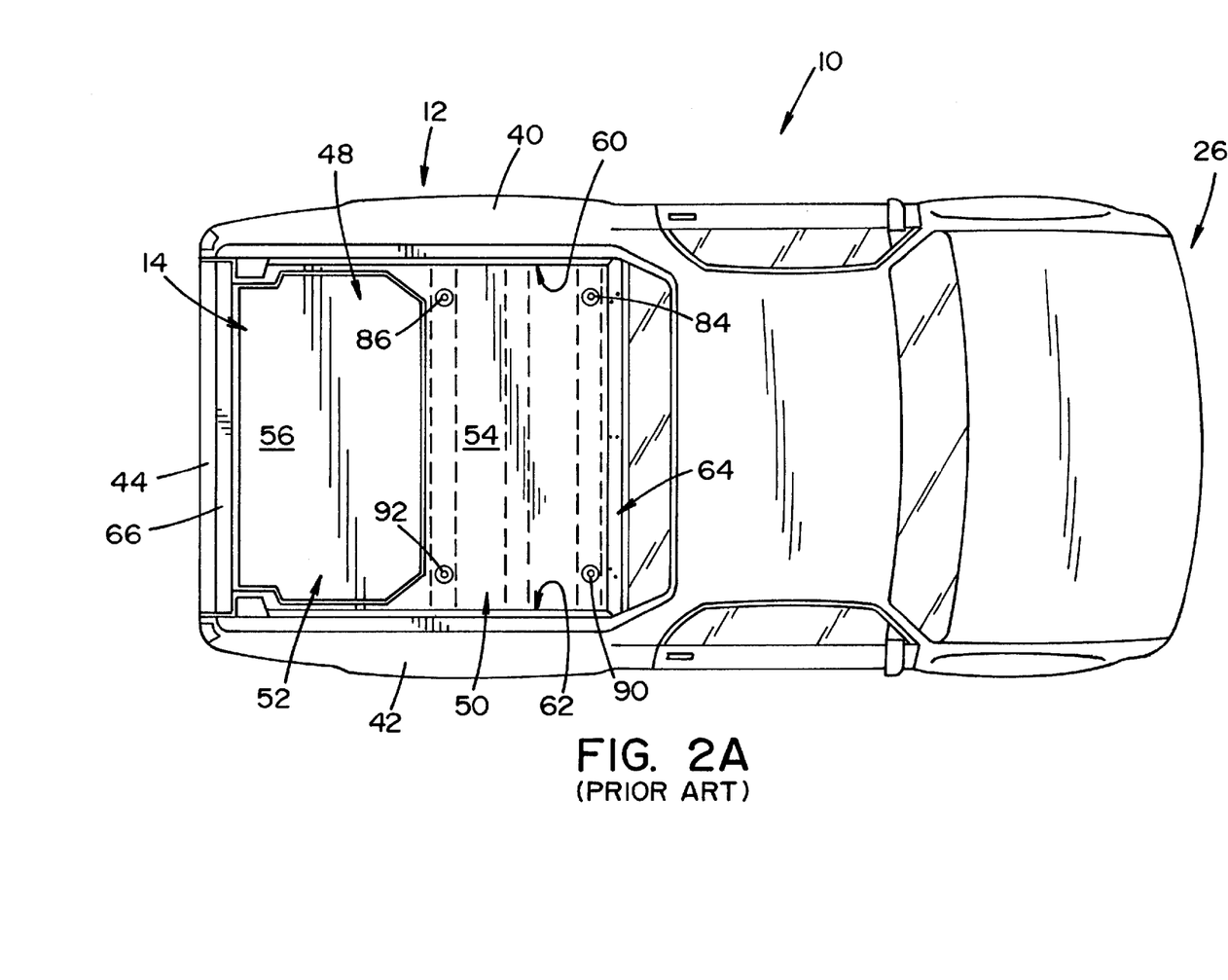
FIG. 2A is a top plan view generally depicting the vehicle of FIG. 1.

Referring now to the drawings, wherein like numerals refer to like parts throughout the several views, FIGS. 1 and 2A illustrate a vehicle or truck 10 including a non-variable load-carrying bed or bed portion 12 of a prior art bed system 14. The truck 10 can include a cab portion 20 including a passenger compartment 22 having passenger doors 24 and an engine compartment 26. The bed portion 12 includes a tailgate 30 selectively closing an open end of the bed portion 12 to restrain cargo therein during movement of the truck 10. However, the bed portion can alternatively include a net or cage in lieu of the tailgate, or perhaps can not include any such rear cargo restraint whatsoever.

Figure 3:
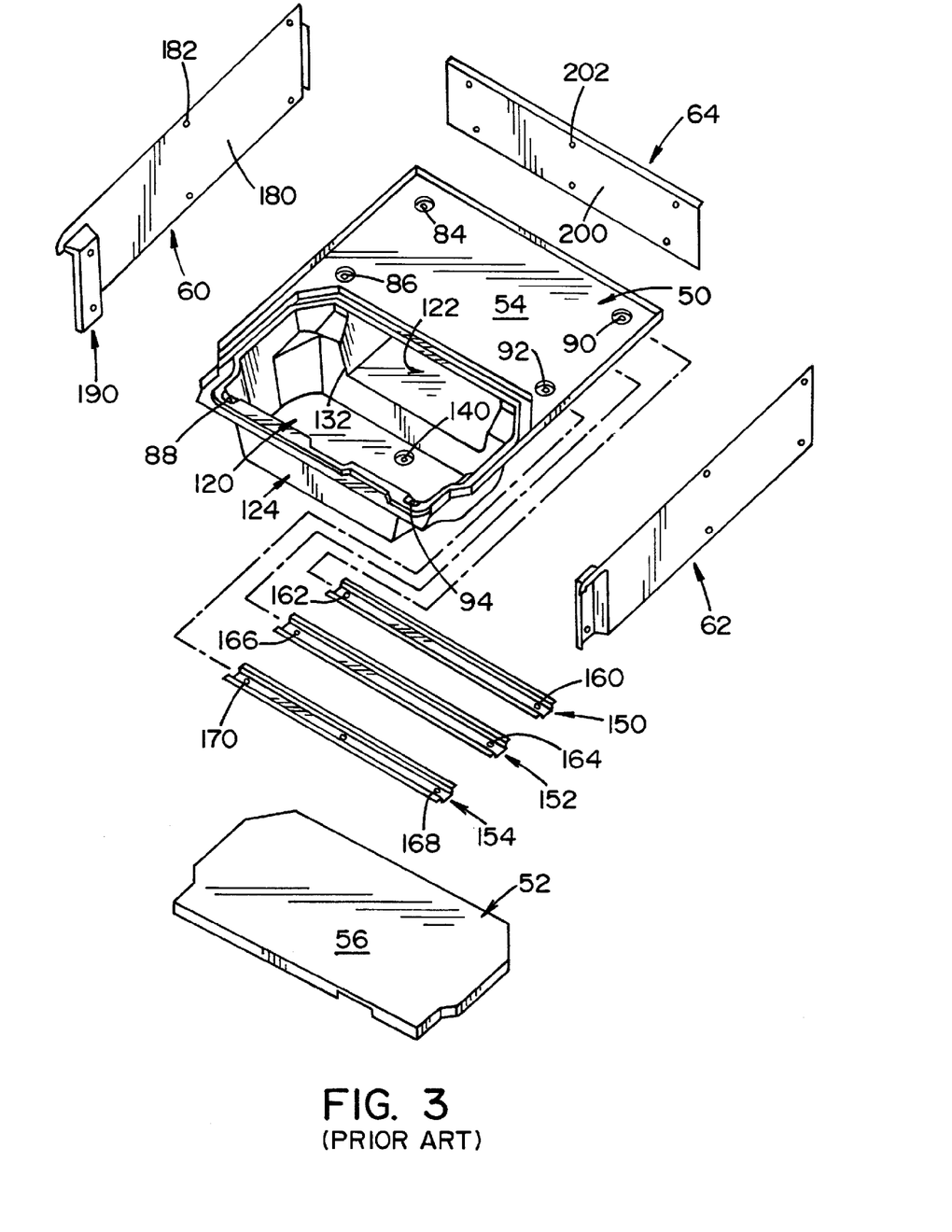
FIG. 3 is an exploded perspective view of selected components of the prior art bed system of FIG. 1.

As shown in FIG. 2A, the truck bed portion 12 includes a plurality of outer body components, including a left outer body panel 40, a right outer body panel 42, and an outer portion 44 of the tailgate 30. Such outer body components 40, 42, 44 can be formed from any of a variety of materials such as steel, aluminum, plastic, fiberglass, composites, etc., and/or a combination thereof. The bed portion 12 can further include one or more inner bed components that substantially define a cargo area of the bed portion. Such inner bed components can include, for example, a floor structure 48 comprising a bed floor 50 and a closure member 52, such as a cargo lid, which can form a portion of the bed floor 50. As shown in FIG. 3, the closure member 52 is at least partially surrounded by the bed floor 50. The bed floor 50 can include a first support 54, and the closure member 52 can form a second support 56. The first support 54 defines a first plane which can be substantially coplanar with a second plane defined by the second support when the closure member 52 is closed. The first and second supports 54, 56 can substantially provide or define the cargo carrying floor of the bed portion 12, and can accordingly directly support cargo. Both the bed floor 50 and the closure member 52 can include raised contours which can provide rigidity and/or texture to a cargo carrying floor.

With continued reference to FIGS. 1 and 2A, the inner bed components can further include a left side member 60, a right side member 62, a headboard member 64, and/or an inner portion 66 of the tailgate 30. The side members 60, 62 and the headboard member 64 can extend upwardly from a location adjacent to at least a portion of the bed floor 50. The members 60, 62, 64 and the tailgate portion 66 can assist in restraining cargo within the truck bed portion 12. The inner bed components can be formed from any number of materials, as for example, steel, aluminum, plastic, fiberglass, composites, etc., and/or a combination thereof.

Figure 2B:
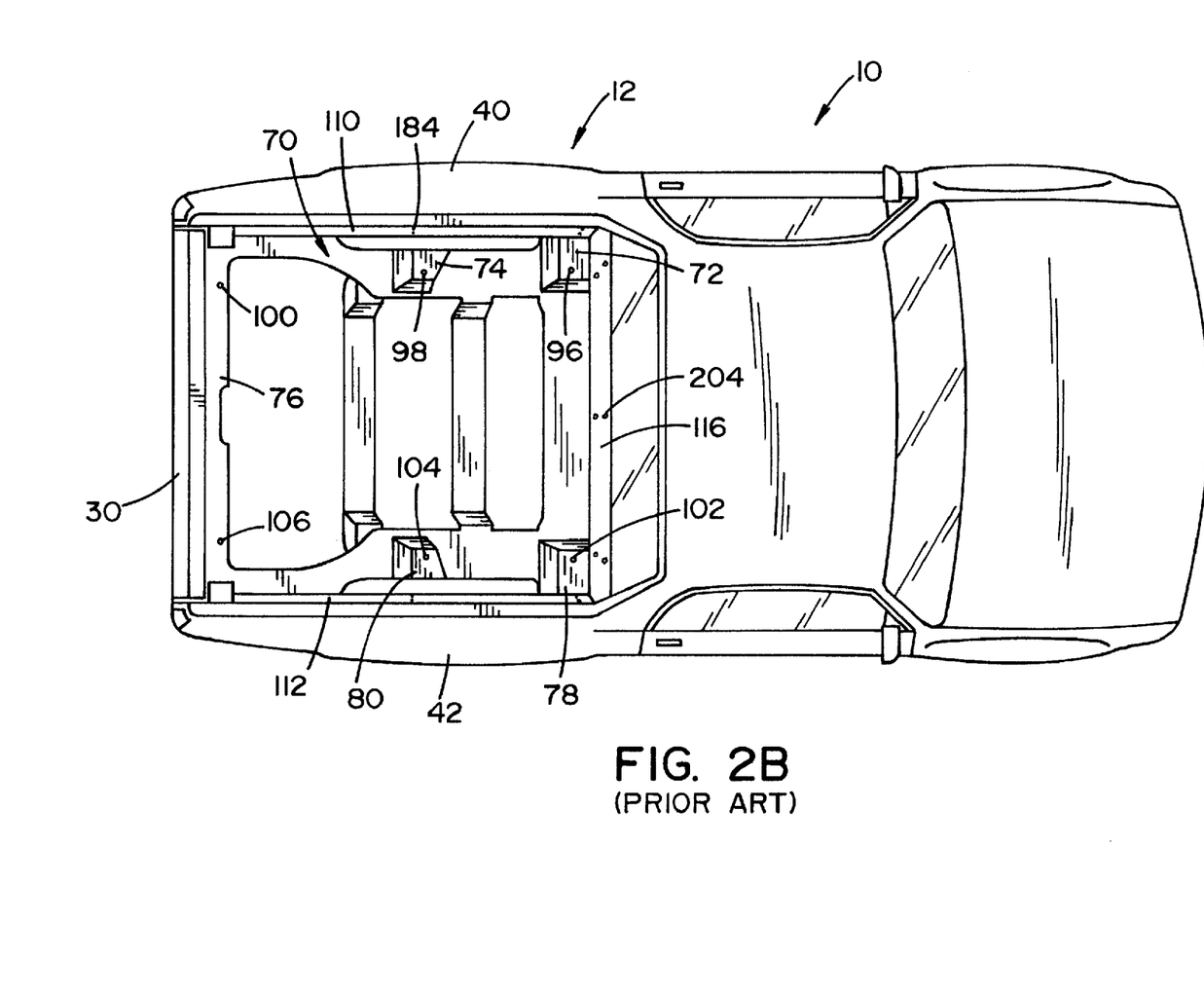
FIG. 2B is a top plan view depicting the vehicle of FIG. 2A with certain components removed to expose an underlying support structure of the bed system.

With reference to FIG. 2B, the inner bed components 60, 62, 64, 66 can be supported by an underlying support structure 70. The support structure 70, which can be a metal support structure, can be in a fixed position relative to the truck 10, and can be secured to a truck frame or unibody (not shown) such as with welds, bolts, or other fastening means. Alternatively, the support structure 70 can be integral with the truck's frame or unibody. When formed as a metal, the support structure 70 can be formed from steel, aluminum, one or more other metals, and/or a combination thereof. Alternatively, the support structure 70 can be formed of some other material (e.g., a composite).

The support structure 70 can include one or more support members which provide support and/or a fastening location for at least a portion of one or more of the inner bed components. More specifically, as shown in FIG. 2B, the support structure integrally includes a plurality of support members 72, 74, 76, 78 and 80 that are configured to provide subjacent support to the bed floor 50 and the closure member 52. With reference to FIGS. 2A, 2B and 3, the bed floor 50 can be fixedly supported by the support structure, for example, by aligning apertures 84, 86, 88, 90, 92 and 94 in the bed floor 50 with apertures 96, 98, 100, 102, 104 and 106 in the respective support members 72, 74, 76, 78 and 80, and then by inserting bolts or other fasteners through these aligned apertures.

The support structure 70 also includes a left support structure 110 for providing support for the left outer body panel 40 and/or the left side member 60, a right support structure 112 for providing support for the right outer body panel 62 and/or the right side member 62, and a headboard support structure 116 for providing support for the headboard member 64. The specific configuration of the support structure depends upon the specific configuration of the inner bed components, for example, the shape of the bed floor 50, and thus it need not be configured exactly as illustrated herein.

Figure 8:
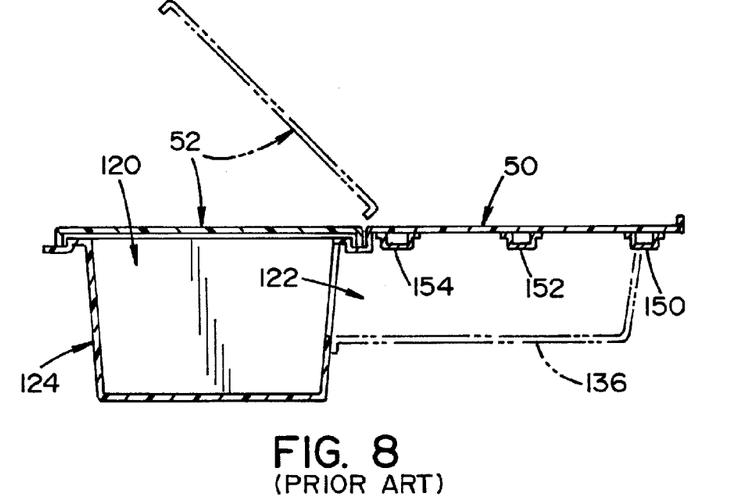
FIG. 8 is cross-sectional view of a floor structure of the bed system of FIG. 1.

With reference to FIG. 3, the closure member 52 can be opened to reveal both a first chamber 120 and a second chamber 122, wherein the second chamber can be separate from the first chamber. The first chamber 120 is substantially defined by a first shell 124, which generally is integrally formed with the bed floor 50 (see FIG. 8). The first shell 124 includes a first opening 130 that is configured to be selectively covered by the closure member 52 when the closure member is closed, and a second opening 132. The second chamber 122 can be accessible from the first chamber 120 through this second opening 132, and can be disposed substantially directly beneath the bed floor 50 and adjacent to the second opening 132 in the first shell 124. The second chamber 86 can be partially defined by the underside of the bed floor 50, and can be further defined by a second shell 136 (schematically illustrated in FIG. 8). The first and second openings 130, 132 are each of sufficient size and dimension to allow the passage of a spare tire (not shown) therethrough. One or more drain holes 140 can be provided in the first shell to facilitate the egress of moisture or accumulated fluid (e.g., water) from within the first chamber 120 and/or the second chamber 122 to the outside atmosphere.

As shown in FIG. 3, support braces 150, 152 and 154 can be located below the bed floor 50. The support braces span across at least part of the width of the truck 10. Support brace 150 includes apertures 160 and 162. Support brace 152 includes apertures 164 and 166. Support brace 154 includes apertures 168 and 170. Bolts or other fasteners inserted through apertures 84 and 90 in the bed floor 50 can extend through the apertures 160 and 162 of the support brace 150, and then into the apertures 96 and 102 of the bed floor support members 72 and 78, respectively, of the support structure 70. Likewise, bolts or other fasteners inserted through apertures 88 and 94 in the bed floor support can extend through the apertures 168 and 170 of the support brace 154, and then into the apertures 100 and 106 of the bed floor support member 76. In this manner, the bed floor 50 can be secured to and supported by the underlying support structure 70 of the truck bed portion 12.

The closure member 52 can include a support panel (not shown) that substantially underlies the second support surface 56 for providing strength and rigidity to the second support surface. The closure member 52 can be associated with the bed floor 50 in any of a variety of specific configurations. For example, hinges (not shown) can connect the closure member 52 directly to the bed floor 50, directly to the first shell 124 and/or to another portion of the truck bed 12. A securement mechanism (not shown) can be moveable between locked and unlocked positions for selectively locking or retaining the closure member in a closed position. An opening mechanism (not shown) can be coupled to the securement mechanism to move the securement mechanism between locked and unlocked positions.

As indicated above, the support structure 70 provides support to the inner components. As shown in FIGS. 2B and 3, the left side member 60 can include a surface 180 that is configured to directly contact cargo within the truck bed 12 and to assist in restraining the cargo within the truck bed. The left side member 60 is depicted as having a plurality of spaced apart apertures 182 to facilitate the securement of the left side member 20 against the left support structure 110. Bolts or other fasteners inserted through apertures 182 can extend through the corresponding apertures 184 of the left support structure. The left side member 60 is a single rectangular member extending vertically from the bed floor 50, and further extending horizontally from the headboard member 64 to a position adjacent to the rear of the truck bed portion 12. A pillar garnish member 190 is integral with the left side member 60. Since the features of the right side member 62 are generally a mirror image of the left side member 60, detailed description thereof will be omitted for conciseness.

The generally rectangular headboard member 64 can include a surface 200 that is configured to directly contact cargo within the truck bed 12 and to assist in restraining the cargo within the truck bed. The headboard member 64 can further include a plurality of spaced apart apertures 202 to facilitate the securement of the headboard member against the headboard support structure 116. Bolts or other fasteners inserted through apertures 202 can extend through the corresponding apertures 204 of the headboard support structure.

As indicated previously, the prior art bed system 14 comprises fixed sized inner bed components, namely, the floor structure 28, the left and right side members 60 and 62, respectively, and the headboard member 64. The floor structure 28 includes the bed floor 50, the closure member 52 and the first shell 124, which is typically integrally formed with the bed floor. Because of the fixed sizes of the inner bed components, for trucks of varying size, separate side members and floor structures are required. This increases the costs associated with offering trucks of varying size. The present disclosure provides a system or means wherein vehicles can be offered with varying bed sizes while minimizing the costs of offering such a vehicle because fewer parts are substituted when the bed length is changed.

Figure 4:
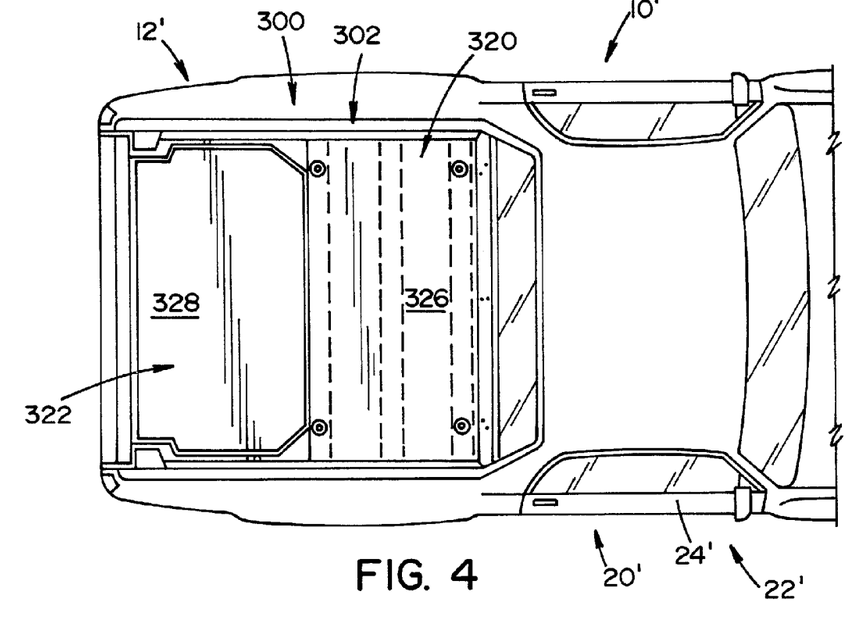
FIGS. 4 and 5 are partial top plan views of a vehicle having a bed system with a variable load-carrying bed according to one aspect of the present disclosure.
Figure 5:
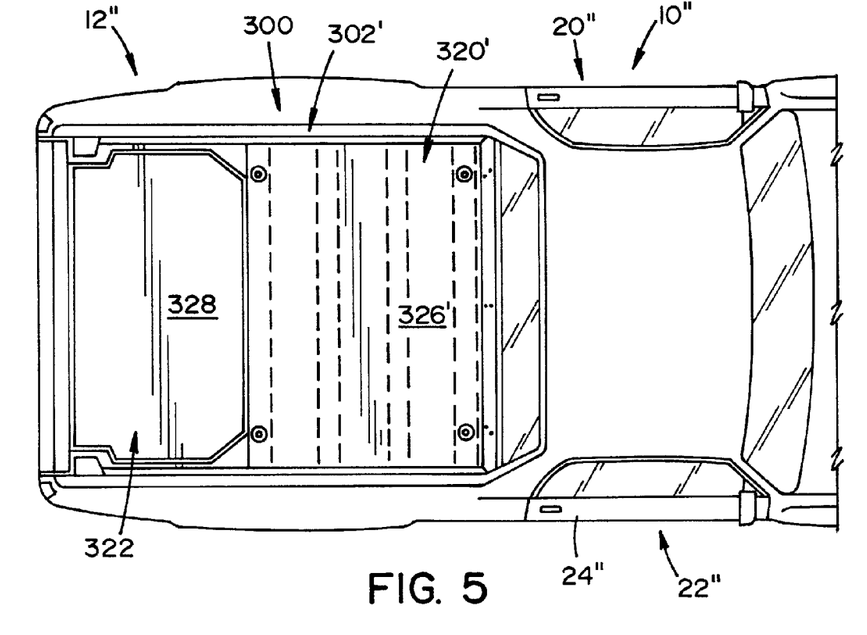

With reference to FIGS. 4-7 and 9-16, a bed system 300 for use with vehicles having varying load-carrying bed sizes according to the present disclosure is illustrated. Reference numerals with a primed suffix (') refer to like components and will be explained in no more detail. As shown in FIG. 4, a vehicle or truck 10' includes a load-carrying bed portion 12' having a first length. As shown in FIG. 5, a truck 10" can alternatively be constructed to include a bed portion 12" having a second, longer length. The bed system 300 allows for selection of components that form the vehicle's bed portion (e.g., bed portion 12' or 12") to be selected from a plurality of components of varying sizes so that a bed of a preferred size can be constructed without requiring an entire vehicle redesign. In the embodiment(s) discussed herein, the bed system 300 allows either bed portion 12' or 12" to be constructed or formed depending on use as part of truck 10' or 10", the bed portions 12', 12" being of varying sizes. Each illustrated truck 10', 10" includes a cab portion 20', 20" including a passenger compartment 22', 22" having passenger doors 24', 24". Although the passenger compartment is depicted as having only two passenger doors, it is to be understood that a bed system 300 constructed in accordance with the present disclosure is suitable for use with virtually any type of pickup truck cab, including for example, an extended cab, a crew cab (e.g., with four passenger doors), etc.

Figure 11:
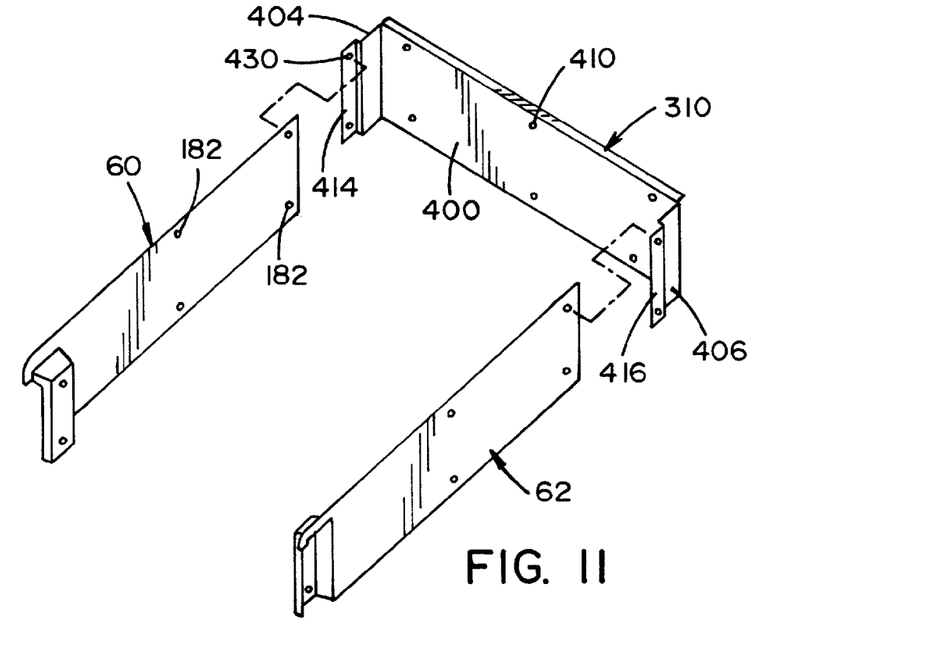
FIGS. 11 and 12 are perspective views of a headboard member of a bed system according to another aspect of the present disclosure.
Figure 12:
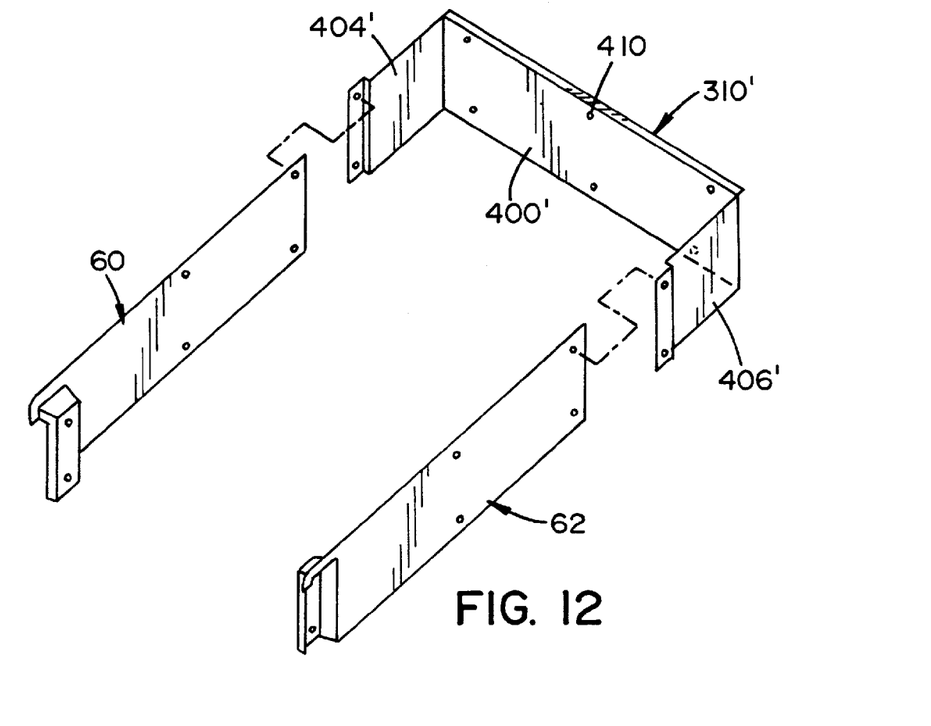

Similar to the prior art bed system 14, the bed system 300 comprises inner bed components, namely, a floor structure 302 or 302' (FIGS. 4 and 5), a left side member 304 or 304' and a right side member 306 or 306' (FIGS. 15 and 16), and a headboard member 310 or 310' (FIGS. 11 and 12). However, in contrast to the bed system 14, the bed system 300 allows for the selection of variably-sized inner bed components to form a bed of a desired size on a common vehicle design. For example, if a smaller bed (such as bed portion 12') is desired, appropriate components 302, 304, 306, 310 (i.e., a first group of components) can be selected to form the bed. If a larger bed (such as bed portion 12") is desired, appropriate components 302', 304', 306', 310' (i.e., a second group of components) can be selected to form the bed. In any case, the side members and headboard member extend upwardly from a location adjacent to the floor structure and are configured to directly contact cargo within the truck bed portion 12' or 12" and to assist in restraining the cargo within the truck bed. The selected inner bed components can be supported by an underlying support structure in a similar manner as the support structure 70 described above.

The floor structure 302 or 302' is formed by a bed floor 320 or 320' and a closure member 322, such as a cargo lid. The bed floor is a variable length component of the bed system 300, the length being dependent on the size of the truck (i.e., the length of the load-carrying bed portion 12' or 12" of the truck). Thus, when the floor structure 302 is selected, a bed floor 320 is provided for use with closure member 322. When the floor structure 302' is selected, a bed floor 320' is provided for use with closure member 322. In any case, the bed floor includes or provides a first support (bed floor 320 providing first support 326 and bed floor 320' providing first support 326') and the closure member 322 can include or provide a second support 328. The closure member 322 can be a common component used with either of the groups of components. As shown, the first support 326 or 326' defines a first plane which can be substantially coplanar with a second plane defined by the second support 328 when the closure member 322 is closed. The first and second supports 326, 328 or 326', 328' can substantially provide the cargo carrying floor of the truck bed portion 12' or 12" and can accordingly directly support cargo.

Figure 6:
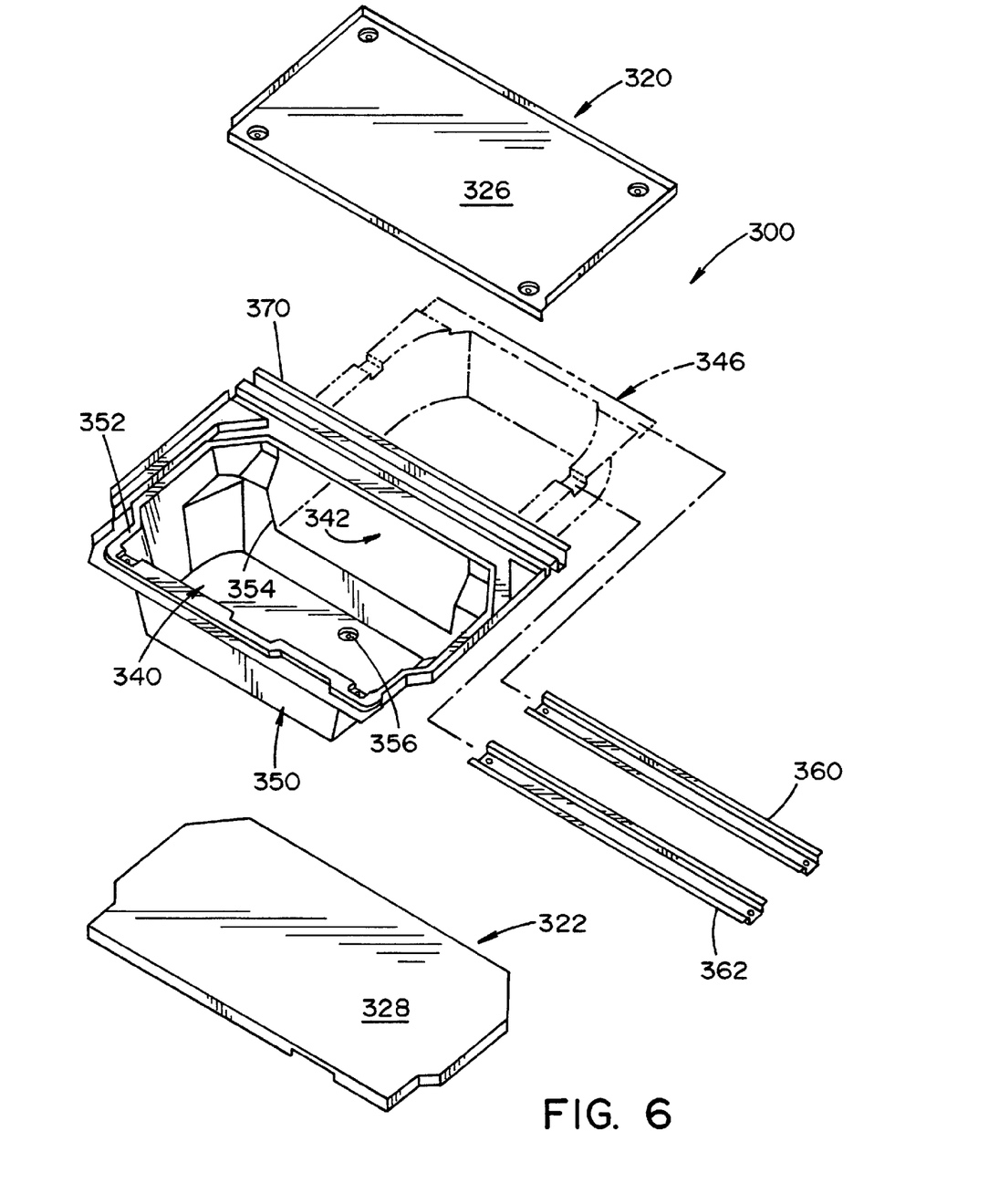
FIGS. 6 and 7 are respective exploded perspective views of selected components of the bed system of FIGS. 4 and 5.
Figure 7:
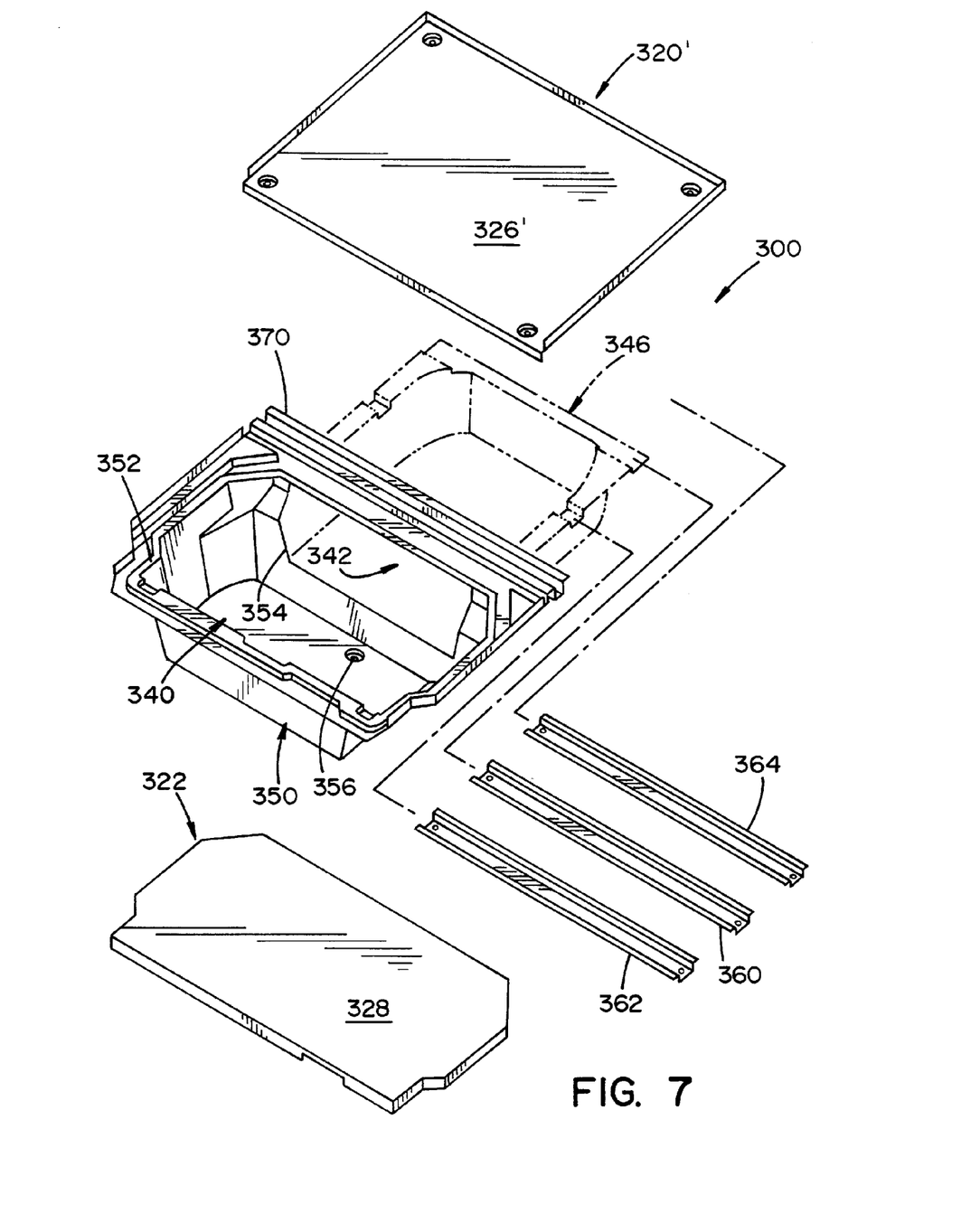

With reference to FIGS. 6 and 7, the closure member 322 can be opened to reveal both a first chamber 340 and a second chamber 342, wherein the second chamber can be separate from the first chamber. Similar to closure member 52, hinges (not shown) can connect the closure member 322 directly to the bed floor 320, 320', directly to a first shell 350 and/or to another portion of the truck bed. The first chamber 340 is substantially defined by the first shell 350. The first shell is a fixed length component of the bed system 300 and is separate from the bed floor 320 or 320'. The differing lengths of the bed floor components 320, 320' allow the fixed sized first shell 350 to be used in any sized load-carrying bed portion (e.g., bed 12', 12"). As shown, the first shell 350 includes a first opening 352 that is configured to be selectively covered by the closure member 322 when the closure member is closed, and a second opening 354. The second chamber 342 can be accessible from the first chamber 340 through the second opening 354, and can be disposed substantially directly beneath the bed floor 320 or 320' and adjacent to the second opening in the first shell 350. The second chamber 342 can be partially defined by a second shell 346 (schematically illustrated in FIGS. 6 and 7). One or more drain holes 356 can be provided in the first shell 350 to facilitate the egress of moisture or some other accumulated fluid (e.g., water) from within the first chamber 340 and/or the second chamber 342 to the outside atmosphere.

Figure 9:
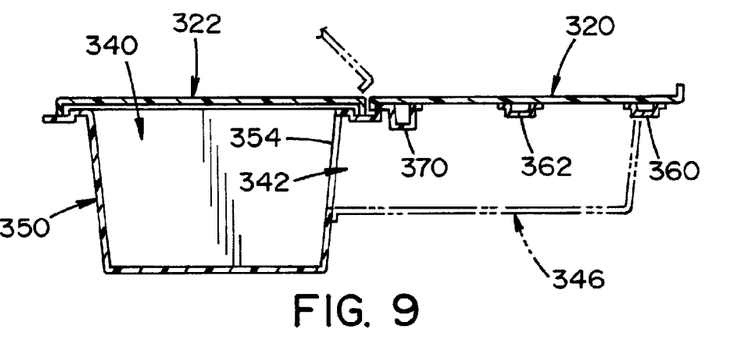
FIG. 9 is cross-sectional view of a floor structure of the bed system of FIG. 4.
Figure 10:
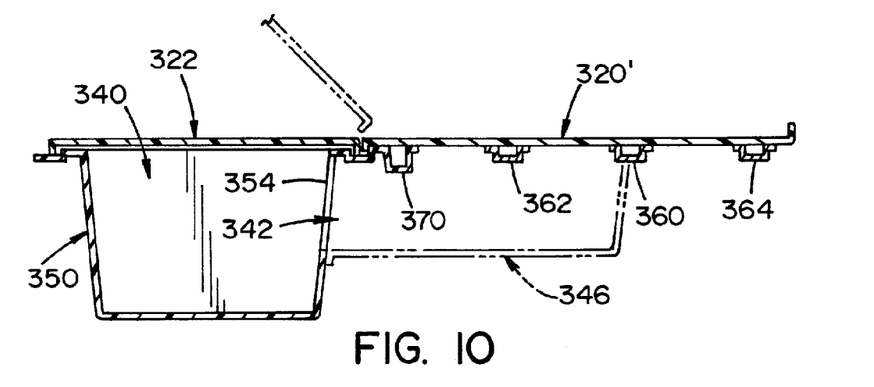
FIG. 10 is cross-sectional view of a floor structure of the cargo protecting system of FIG. 5.

With additional reference to FIGS. 9 and 10, first reinforcement components or first support braces 360 and 362 are located below the bed floor 320 or 320'. It should be appreciated that because bed floor 320' has a longer length than bed floor 320, an additional first support brace 364 can be implemented if desired. The first support braces span across at least part of the width of the truck. The first shell 350 includes a second reinforcement component 370. The second reinforcement component 370 is located beneath and connected to a first end section of the bed floor 320 or 320'. In the depicted embodiment, the second reinforcement component 370 is integral with the first shell 350. The first shell and the second reinforcement component 370 can be formed as a unitary molded product having a fixed predetermined size. Although, it should be appreciated that the second reinforcement member 370 can be a separate member secured to at least one of the bed floor 320 or 320' and the first shell 350.

The first reinforcement components 360, 362 (and sometimes 364) and the second reinforcement component 370 are secured to an underside of the bed floor 320 or 320' in a manner similar to support brace 150 described above. In this manner, the bed floor 320 or 320' can be secured to and supported by the underlying support structure of the truck bed portion 12 or 12'. The first and second reinforcement components have a generally C-shaped cross section. Providing the first and second reinforcement components with a generally C-shaped cross section increases the bending inertia of the first and second reinforcement components.

As indicated previously, to accommodate trucks of varying size, the bed system 300 includes the separate bed floor 320 or 320' which has a length dependent on the length of the truck bed portion 12' or 12" (i.e., bed floor 320' being longer than bed floor 320). It is also preferred that at least one of the left and right side members 304, 306 and the headboard member 310 include a component having a length also dependent on the size of the truck. Although, it should be understood that a truck bed constructed in accordance with the present disclosure might have a substantially flat cargo carrying floor that is unbounded by side members, a headboard member and/or a tailgate, such as would be typical of a flat-bed type truck.

With reference to FIGS. 11 and 12, the bed system 300 can include a headboard member 310 or 310' that is generally C-shaped and includes a base 400 or 400' and first and second end sections or arms 404, 406 or 404', 406', respectively, extending a predetermined length outwardly from the base. The base can be a fixed length first component of the headboard member. Each arm is a variable length second component of the headboard member 310 or 310', the length of the arm being dependent on the size of the truck (i.e., the length of the load-carrying bed portion 12' or 12" of the truck, for example). The headboard members 310, 310' allow the bed system 300 to use fixed length common side members, the same or similar to the left and right side members 60, 62 described above. Therefore, according to this aspect of the present disclosure, the bed system 300 only requires that headboard member 310 and the bed floor 320 be substituted with headboard member 310' and bed floor 320' when bed length 12' is elongated to bed length 12".

In the depicted embodiment, the first and second end sections 404, 404' and 406, 406' extend generally perpendicular from respective bases 400, 400'. The base of the headboard members 310, 310' includes a plurality of spaced apart apertures 410 for securing the selected headboard member 310 or 310' against a headboard support structure similar to headboard support structure 116. Bolts or other fasteners inserted through apertures 410 can extend through the corresponding apertures of the headboard support structure. However, one or more of these apertures 410 might not be present, such as when certain alternate securement mechanisms (e.g., adhesives, screws, rivets, push-pins, or the like) are employed to secure the headboard member 310, 310' in place.

To further the strength of the bed system 300, the first and second end sections 404, 404' and 406, 406' can be configured to at least partially overlap at least end portions of the left and right side members 60 and 62, respectively. This overlap can add to the aesthetic appearance of the bed system. As shown in FIGS. 11 and 12, a respective end portion 414, 416 of each first and second end section can be offset such that an outer surface of each first and second end section is generally coplanar with an outer surface of each left and right side member 60, 62. The end portion 414 and the left side member 60 are secured to the left support structure, which is similar to left support structure 110. Particularly, the end portion 414 includes at least one aperture 430 in registry with at least one left side member aperture 182 and at least one left support structure aperture. The at least one apertures of the end portion, side member and left support structure are adapted to receive at least one fastening element. The end portion 416 and the right side member 62 is secured to the right support structure in a similar manner. Cushioning elements (not shown) can be provided at the interface between the headboard member 310, 310' and the left and right side member 60, 62 to maintain a small spacing and to facilitate small movement therebetween. Although, it should be appreciated that this overlapping is not required. In this instance, end portions of the first and second end sections 404, 404' and 406, 406' are not offset and are configured to abut ends of the left and right side members 60, 62. The first and second end sections and the left and right side members will be separately secured to the respective left and right support structures.

Figure 13:
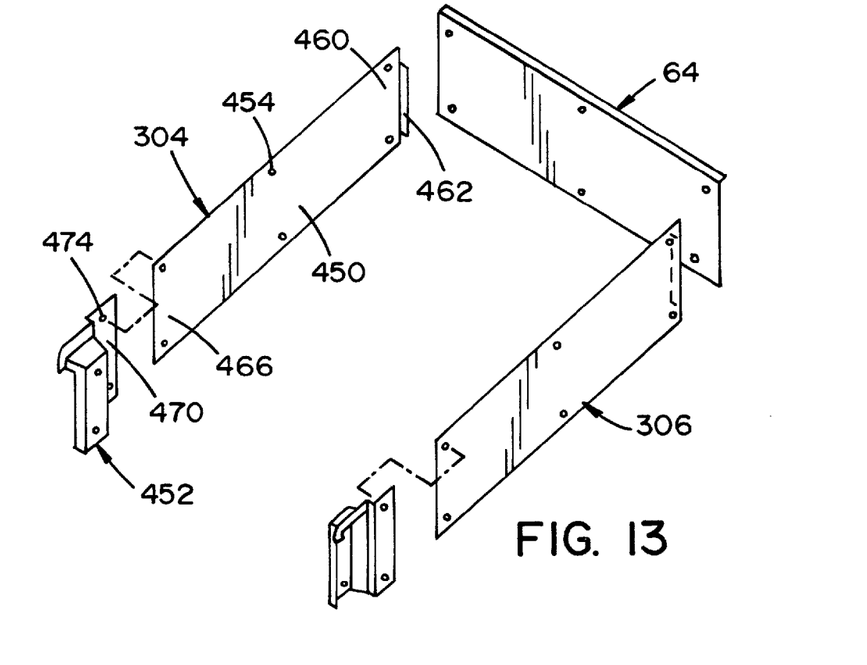
FIGS. 13 and 14 are perspective views of side members of a bed system according to yet another aspect of the present disclosure, the side members being connected to a conventional headboard member.
Figure 14:
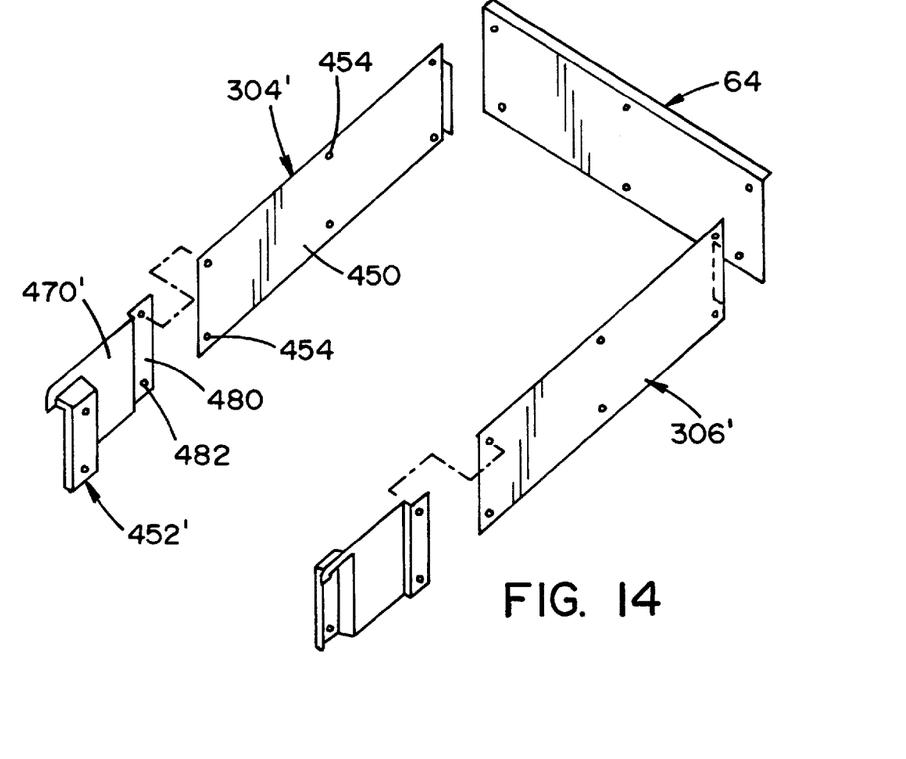

With reference to FIGS. 13 and 14, the depicted left side member 304, which can be the left side member used in the bed system 300 shown in FIGS. 4 and 5, includes a fixed length first component or common side member 450 and a variable length second component or pillar garnish member 452 or 452'. The first component is generally rectangular and includes a plurality of spaced apart apertures 454 to facilitate the securement of the left side member 304 against the left support structure in a manner similar to the securement of left side member 60 to left support structure 110 described above. A first end section 460 of the first component includes a flange 462. Prior to the securement of the headboard member 64 to the headboard support structure 116, the flange is positioned behind the headboard member thereby providing an aesthetic transition between the left side member 304 and headboard member 64. The first component 450 can be integral with the bed floor 320 or 320'.

The pillar garnish member 452 or 452' is a separate member which can be secured to a second end section 466 of the first component 450. The pillar garnish member includes a panel section 470, 470' having a length dependent on the size of the load-carrying truck bed 12', 12". For the shorter length truck bed 12', the panel section 470 can be offset such that an outer surface of the pillar garnish member 452 is generally coplanar with an outer surface of the first component 450. The panel section 470 includes at least one aperture 474 in registry with at least one left side member aperture 454 and at least one left support structure aperture. The at least one apertures are adapted to receive at least one fastening element. For the longer length truck bed 12", the pillar garnish member 452' includes a panel section 470' having an offset end section 480 such that an outer surface of the panel section 470' is generally coplanar with the outer surface of the first component 450. The end section 480 includes at least one aperture 482 in registry with at least one left side member aperture 454 and at least one left support structure aperture. Again, the at least one apertures are adapted to receive at least one fastening element.

The left side member 304, 304' allows the bed system 300 to use a common headboard member. Therefore, according to this aspect of the present disclosure, the bed system 300 only requires that pillar garnish member 452 and the bed floor 320 be substituted with pillar garnish member 452' and bed floor 320' when bed length 12' is elongated to bed length 12". Since the features of the right side member 306 are generally a mirror image of the left side member 304, detailed description thereof will be omitted for conciseness. However, it should be appreciated that the illustrated left side member 304 can be used in the bed system 300 shown in FIGS. 4 and 5.

Figure 15:
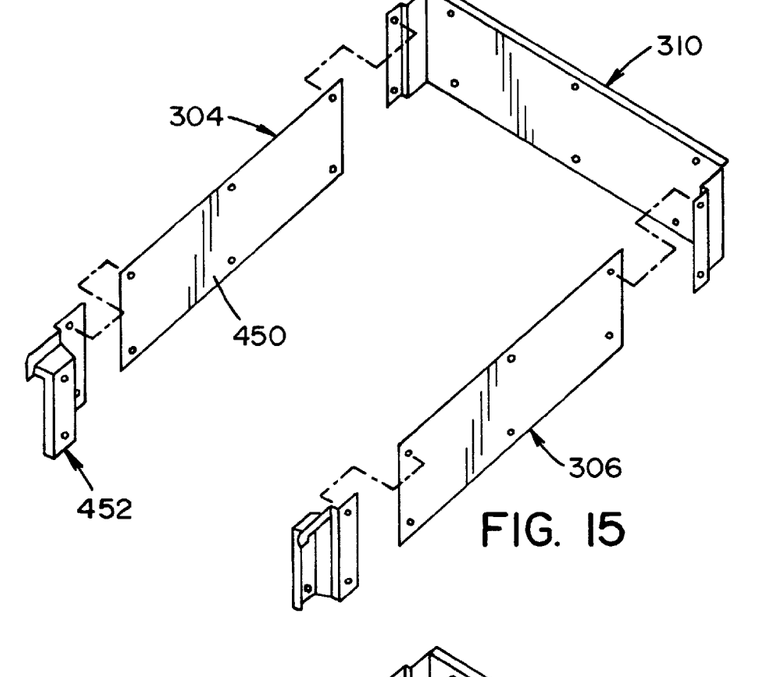
FIGS. 15 and 16 are front perspective views of the respective side members of FIGS. 13 and 14 being connected to the headboard member of FIG. 11.
Figure 16:
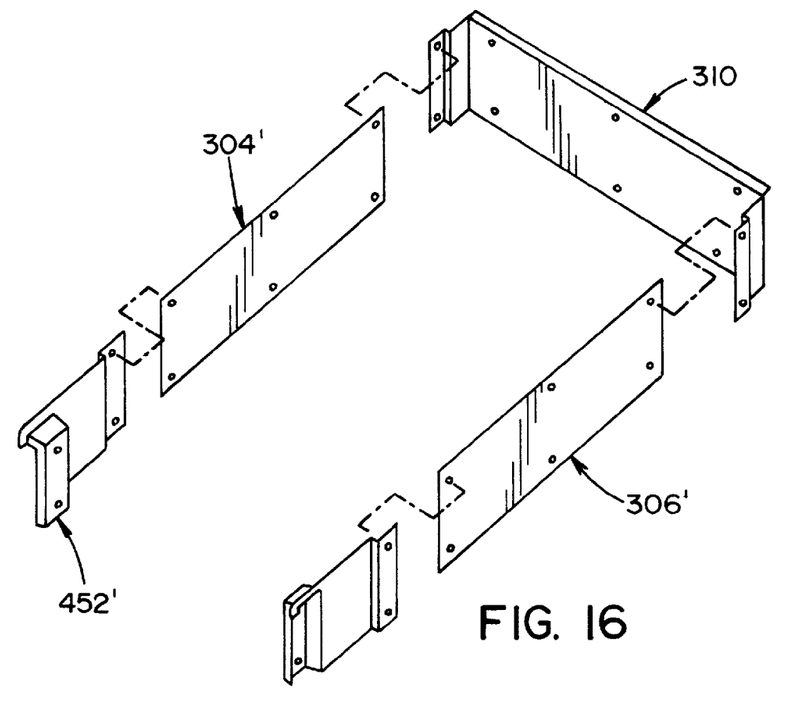

As shown in FIGS. 13 and 14, the left and right side members 304, 304' and 306, 306', respectively, can be associated with headboard member 64. As shown in FIGS. 15 and 16, the left and right side members 304, 304' and 306, 306', respectively, can be associated with headboard member 310.

As will be understood and appreciated by those skilled in the art from the foregoing, the present disclosure provides a method for varying a length of a bed system for a vehicle having a load-carrying bed 12', 12". A floor structure 302, 302' for the load-carrying bed includes one of a first bed floor 320 having a first length and a second bed floor 320' having a second length longer than the first length and a separate shell 350 having a fixed length. One of the first bed floor and the second bed floor is selected, the selection being dependent on the length of the load-carrying bed. A first end section of the shell is connected to a first end section of the bed floor. The shell defines a first storage chamber 340. A closure member 322 having a fixed length is provided. The closure member is hingedly connected to one of the selected bed floor and the shell. The closure member selectively covers at least a portion of the first opening of the shell. Left and right side members 304 and 306 and a headboard member 310 are provided for the load-carrying bed. At least one of the side members and the headboard member includes a fixed length first component and a second component having a length dependent of the length of the selected bed floor 320, 320'. The second component of the side member is a separate pillar garnish 452, 452'. The arms 404, 406 are the second component of the headboard member. A reinforcement component 370 is integrally formed with the first end section of the shell 350.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A variable length bed system for a vehicle having a load-carrying bed, the vehicle including a support structure configured to provide support to the bed system, the bed system comprising:
   a floor structure including a bed floor and a separate shell,
   a first support having a first length and another first support having a second length that is greater than said first length,
   wherein the bed floor is a selected support selected from the first support having the first length and the another first support having the second length, the separate shell being connected to a first end section of the selected support and defining a first storage chamber disposed adjacent the selected support, the shell having first and second openings, the first chamber being accessible through the first opening, the shell having a fixed size, wherein the differing lengths of the first supports allow the fixed sized shell to be used in varying vehicle sized load-carrying beds, and
   further comprising a fixed length first component, a second component having a first length and another second component having a second length greater than the first length,
   wherein the first component is a common side member extending upwardly from a location adjacent to the bed floor and each second component is a separate pillar garnish member, the pillar garnish member for use with the common side member to form a side member for the bed system being a selected pillar garnish member that is selected from the second component having the first length and the second component having the second length, the selected pillar garnish member being connected to the common side member and being selected based on the size of the vehicle load-carrying bed.

2. The bed system of claim 1, further comprising at least one first reinforcement component connected to an underside of the selected support.

3. The bed system of claim 2, wherein the shell includes a second reinforcement component, the second reinforcement component being connected to the selected support.

4. The bed system of claim 3, wherein the second reinforcement component is integral with the shell.

5. The bed system of claim 1, wherein the floor structure defines a second storage chamber disposed substantially directly beneath the selected support and adjacent to the second opening, the second chamber being separate from the first chamber and accessible from the first chamber through the second opening.

6. The bed system of claim 1, further comprising a closure member hingedly connected to one of the bed floor and shell, the closure member providing a second support for directly supporting cargo, the closure member being configured to selectively cover at least a portion of the first opening.

7. The bed system of claim 1, wherein the common side member is integral with the bed floor.

8. The bed system of claim 1, further comprising a headboard member extending upwardly from a location adjacent to the bed floor, the headboard member including a base and first and second arms extending a predetermined length from respective first and second end portions of the base.

9. The bed system of claim 8, wherein each arm is secured to one of the common side member and the selected pillar garnish member, wherein the fixed length of the arms is dependent on the length of the vehicle load-carrying bed.

10. The bed system of claim 8, wherein the headboard member is generally C-shaped.

11. A variable length bed system for a vehicle having a load-carrying bed, the vehicle including a support structure configured to provide support to the bed system, the support structure being in a fixed position relative to the vehicle, the bed system comprising:

a bed floor for directly supporting cargo, the bed floor being selected from a first support having a first length and another first support having a second length that is greater than the first length, the selection of one of the first supports being dependent on an overall size of the vehicle load-carrying bed;

a separate shell having a fixed length, a first end section of the shell being connected to a first end section of the selected first support, the first supports allowing the same shell to be used in any sized vehicle load-carrying bed, the shell defining a first storage chamber disposed adjacent the first support;

at least one side member extending upwardly from a location adjacent to the shell and bed floor;

a headboard member extending upwardly from a location adjacent to a second end section of the bed floor, the headboard member being a selected headboard member selected from a first headboard member and a second headboard member, the first headboard member including a base and first and second arms extending a first length from the base, the second headboard member including a base and first and second arms extending a second length from the base, the second length being greater than the first length, the selection of the selected headboard member being dependent on the size of the vehicle load-carrying bed; and a closure member hingedly connected to one of the bed floor and the shell, the closure member defining a second support for directly supporting cargo, the closure member being configured to selectively cover at least a portion of the first opening.

12. The system of claim 11, wherein the at least one side member has a fixed length and further including a separately connected pillar garnish member having a length dependent on the size of the vehicle load-carrying bed.

* * * * *